(12) United States Patent
Iizuka et al.

(10) Patent No.: US 8,264,773 B2
(45) Date of Patent: Sep. 11, 2012

(54) GRATING STRUCTURE FOR SPLITTING LIGHT

(75) Inventors: Hideo Iizuka, Ann Arbor, MI (US); Nader Engheta, Berwyn, PA (US)

(73) Assignees: Toyota Motor Engineering and Manufacturing North America, Inc., Erlanger, KY (US); The Trustees of the University of Pennsylvania, Philadelphia, PA (US)

( * ) Notice: Subject to any disclaimer, the term of this patent is extended or adjusted under 35 U.S.C. 154(b) by 567 days.

(21) Appl. No.: 12/434,269

(22) Filed: May 1, 2009

(65) Prior Publication Data
US 2010/0277797 A1 Nov. 4, 2010

(51) Int. Cl.
*G02B 5/18* (2006.01)

(52) U.S. Cl. .......... 359/569; 359/489.06; 359/489.2

(58) Field of Classification Search .......... None
See application file for complete search history.

(56) References Cited

U.S. PATENT DOCUMENTS

| | | | |
|---|---|---|---|
| 6,219,478 | B1 | 4/2001 | Parriaux et al. |
| 6,762,880 | B2 | 7/2004 | Holm et al. |
| 6,900,939 | B2 | 5/2005 | Hoshi et al. |
| 7,139,128 | B2 | 11/2006 | Smith et al. |
| 7,268,946 | B2 | 9/2007 | Wang |
| 7,319,559 | B2 | 1/2008 | Nakama et al. |
| 7,369,186 | B2 | 5/2008 | Momoki |
| 2006/0127829 | A1 | 6/2006 | Deng et al. |
| 2006/0127830 | A1 | 6/2006 | Deng et al. |
| 2007/0165307 | A1 | 7/2007 | Perkins |
| 2007/0297053 | A1 | 12/2007 | Wang |
| 2008/0055719 | A1 | 3/2008 | Perkins et al. |
| 2008/0055723 | A1 | 3/2008 | Gardner et al. |
| 2008/0074748 | A1 | 3/2008 | Kittaka et al. |
| 2008/0266662 | A1 | 10/2008 | Perkins |
| 2008/0316599 | A1 | 12/2008 | Wang |

FOREIGN PATENT DOCUMENTS

| | | |
|---|---|---|
| JP | 02-259702 | 10/1990 |
| JP | 2007-317266 | 12/2007 |
| WO | WO 00-57215 | 9/2000 |

OTHER PUBLICATIONS

"The Design of a Polarizing Beam Splitter Made From a Dielectric Rectangular-Groove Grating," by Juan Liu et al., Optics & Laser Technology 41 (2009) pp. 622-626.

International Search Report of PCT/US2010/033394 Mailed Nov. 30, 2010.

T. Clausnitzer, T. Kämpfe, E.-B. Kley and A. Tünnermann, "*An intelligible explanation of highly-efficient diffraction in deep dielectric rectangular transmission gratings*", Dec. 26, 2005 / vol. 13, No. 26 / Optics Express, pp. 10448-10456.

B. Wang, C. Zhou, S. Wang, and J. Feng, "*Polarizing beam splitter of a deep-etched fused-silica grating*", ©2007 Optical Society of America, May 15, 2007 / Vo. 32, No. 10 / Optics Letters, pp. 1299-1301.

(Continued)

*Primary Examiner* — Derek S Chapel
(74) *Attorney, Agent, or Firm* — Brinks Hofer Gilson & Lione

(57) ABSTRACT

A grating structure for splitting light. The grating structure including alternating ridges and grooves. The ridges and grooves are configured such that the grating directs p-polarization components of incident light to the $-1^{st}$ order diffraction mode and s-polarization components of incident light to the $0^{th}$ order diffraction mode.

17 Claims, 7 Drawing Sheets

OTHER PUBLICATIONS

M.G. Moharam and T.K. Gaylord, "*Diffraction analysis of dielectric surface-relief gratings*", ©1982 Optical Society of America, vol. 72, No. 10 / Oct. 1982 / J. Opt. Soc. Am., pp. 1385-1392.

N. Bonod, G. Tayeb, D. Maystre, S. Enoch, and E. Popov, "*Total absorption of light by lamellar metallic gratings*", ©1008 OSA, Sep. 29, 2008 / vol. 16, No. 20 / Optics Express, pp. 15431-15438.

M. Shokooh-Saremi and R. Magnusson, "*Wideband leaky-mode resonance reflectors: Influence of grating profile and sublayers*", ©2008 OSA, Oct. 27, 2008 / vol. 16, No. 22 / Optics Express, pp. 18249-18263.

P. Sheng, R.S. Stepleman, P.N. Sanda, "*Exact eigenfunctions for square-wave gratings: Application to diffraction and surface-plasmon calculations*", ©1982 The American Physical Society, Physical Review B, vol. 26, No. 6, Sep. 15, 1982, pp. 2907-2917.

T. Clausnitzer, T. Kämpfe, E.-B. Kley, A. Tunnermann, A.V. Tishchenko, and O. Parriaux, "*Highly Dispersive dielectric transmission gratings with 100% diffraction efficiency*", ©2008 OSA, Apr. 14, 2008 / vol. 16, No. 8 / Optics Express, pp. 5577-5584.

T. Clausnitzer, T. Kämpfe, F. Brückner, R. Heinze, E.-B. Kley, and A. Tünnermann, "*Reflection-reduced encapsulated transmission grating*", ©1008 OSA, Optics Letters / vol. 33, No. 17 / Sep. 1, 2008, pp. 1972-1974.

N. Takeshima, Y. Narita, and S. Tanaka, "*Fabrication of high-efficiency diffraction gratings in glass*", ©2005 OSA, Optics Letters / vol. 30, No. 4 / Feb. 15, 2005, pp. 352-354.

D.K. Jacob, S.C. Dunn, and M.G. Moharam, "*Interference approach applied to dual-grating dielectric resonant grating reflection filters*", ©2001 OSA, Nov. 15, 2001 / vol. 26, No. 22 / Optics Letters, pp. 1749-1751.

J.R. Marciante, D.H. Raguin, "*High-efficiency, high-dispersion diffraction gratings based on total internal reflection*", ©2004 OSA, Optics Letters / vol. 29, No. 6 / Mar. 15, 2004, pp. 542-544.

L. Li, J. Hirsh, "*All-dielectric high-efficiency reflection gratings made with multilayer thin-film coatings*", ©1995 OSA, Jun. 1, 1995 / vol. 20, No. 11 / Optic Letters, pp. 1349-1351.

M. Foresti, L. Menez, A.V. Tishchenko, "*Modal method in deep metal-dielectric gratings: the decisive role of hidden modes*", ©2006 OSA, vol. 23, No. 10 / Oct. 2006 / J. Opt. Soc. Am. A, pp. 2501-2509.

J. Zheng, C. Zhou, J. Feng, and B. Wang, "*Polarizing beam splitter of deep-etched triangular-groove fused-silica gratings*", ©2008 SA, Optics Letters / vol. 33, No. 14 / Jul. 15, 2008, pp. 1554-1556.

A.L. Fehrembach, A. Talneau, O. Boyko, F. Lemarchand, and A. Sentenac, "*Experimental demonstration of a narrowband, angular tolerant, polarization independent, doubly periodic resonant grating filter*", ©2007 OSA, Aug. 1, 2007 / vol. 32, No. 15 / Optics Letters, pp. 2269-2271.

M. Shokooh-Saremi and R. Magnusson, "*Particle swarm optimization and its application to the design of diffraction grating filters*", ©2007 OSA, Optics Letters / vol. 32, No. 8 / Apr. 15, 2007, pp. 894-896.

K.Y. Fong and P.M. Hui, "*Controlling enhanced transmission through metallic gratings with subwavelength slits by anistropic waveguide resonance*", ©2007 American Institute of Physics, Applied Physics Letters 91, (2007), pp. 171101-1 to 171101-3.

C. Cheng, J. Chen, Q.Y. Wu, F.F. Ren, J. Xu, "*Controllable electromagnetic transmission based on dual-metallic grating structures composed of subwavelength slits*", ©2007 American Institute of Physics, Applied Physics Letters 91, (2007), pp. 111111-1 to 111111-3.

X. Zhang, S. Feng, H. Liu, and L. Wang, "*Enhanced optical response in doubly waveguided plasmonic gratings*", ©2008 American Institute of Physics, Applied Physics Letters 93, (2007), pp. 093113-1 to 093113-3.

L. Li, "*Multilayer modal method for diffraction gratings of arbitrary profile, depth, and permittivity*", ©1993 OSA, vol. 10, No. 12 / Dec. 1993 / J. Opt. Soc. Am. A, pp. 2581-2591.

S.T. Peng, "*Rigorous formulation of scattering and guidance by dielectric grating waveguides: general case of oblique incidence*", ©1989 OSA, vol. 6, No. 12 / Dec. 1989 / J. Opt. Soc. Am. A, pp. 1969-1883.

S.T. Peng, T. Tamir, and H. L. Bertoni, "*Theory of Periodic Dielectric Waveguides*", IEEE Transactions on Microwave Theory and Techniques, vol. Mtt-23, No. 1, Jan. 1975, pp. 123-133.

M.G. Moharam and T.K. Gaylord, "*Rigorous coupled-wave analysis of planar-grating diffraction*", ©1981 OSA, vol. 71, No. 7 / Jul. 1981 / J. Opt. Soc. Am., pp. 811-818.

Coves, B. Gimeno, J. Gil, M.V. Andrés, A.A. San Blas, and V.E. Boria, "*Full-Wave Analysis of Dielectric Frequency-Selective Surfaces Using a Vectorial Modal Method*", ©2004 IEEE Transactions on Antennas and Propagation, vol. 42, No. 8, Aug. 2004, pp. 2091-2099.

S.T. Peng, T. Tamir, and H. Bertoni, "*Correction to 'Theory of Periodic Dielectric Waveguides'*", IEEE Transactions on Microwave Theory and Techniques, Aug. 1976.

T. Tamir and S. Zhang, "*Modal Transmission-Line Theory of Multilayered Grating Structures*", Journal of Lightwave Technology, vol. 14, No. 5, May 1996, pp. 914-927.

A.V. Tishchenko, "*Phenomenological representation of deep and high contrast lamellar gratings by means of the modal method*", ©Springer 2005, Optical and Quantum Electronics (2003) 37:309-330.

R.C. Hall, R. Mittra, K.M. Mitzner, "*Analysis of Multilayered Periodic Structures Using Generalized Scattering Matrix Theory*", ©1988 IEEE Transactions on Antennas and Propagation, vol. 36, No. 4, Apr. 1988, pp. 511-517.

I.C. Botten, M.S. Craig, R.C. McPhedran, J.L. Adams, J.R. Andrewartha, "*The Dielectric Lamellar Diffraction Grating*", Journal of Modern Optics, 28:3, pp. 413-426, Mar. 1, 1981.

J.Y. Suratteau, M. Cadilhac, R. Petit, "*Sur La Détermination Numérique Des Efficacités De Certains Réseaux Diélectriques Profonds*", J. Optics (Paris), 1983, vol. 14, No. 6, pp. 273-288.

J.R. Andrewartha, G.H. Derrick, R.C. McPhedran, "*A Modal Theory Solution to Diffraction from a Grating with Semi-circular Grooves*", Journal of Modern Optics, 1981, vol. 28, No. 9, pp. 1177-1193.

L. Li, "*A modal analysis of lamellar diffraction gratings in conical mountings*", Journal of Modern Optics, 1993, vol. 40, No. 4, pp. 553-573.

GRATING STRUCTURE FOR SPLITTING LIGHT

BACKGROUND

1. Field of the Invention

The present invention generally relates to a grating structure for splitting light.

2. Description of Related Art

Various grating structures have been introduced in industry. Gratings typically have rows of grating lines that diffract light. The diffracted light is generally distributed into a diffraction pattern forming a number of modes. One type of diffraction grating is a transmission grating. Typically, transmission gratings comprise grooves etched into a transparent material. As the elements of light in the incident spectrum strike the grooves at a certain angle, they are diffracted and, therefore, separated to various degrees. In many optical applications, light sources generate diffuse light with randomized polarizations. In these applications, typical gratings waste much of the light and, therefore, are not efficient in many beam splitting applications.

In view of the above, it is apparent that there exists a need for an improved grating structure.

SUMMARY

In satisfying the above need, as well as overcoming the enumerated drawbacks and other limitations of the related art, the present invention provides an improved grating structure for splitting light.

In one configuration, the grating structure includes alternating ridges and grooves. The ridges and grooves are configured such that the grating directs p-polarization components of incident light to the $-1^{st}$ order diffraction mode and s-polarization components of incident light to the $0^{th}$ order diffraction mode.

In additional aspects, the ridges and grooves may form a fused silica to air interface. The ridges and grooves may be configured such that the grating has a ratio of the effective refractive index difference between s-polarization and p-polarization of about 1/2. As such, for non-polarized light with an incident angle $\theta_{in}$ of between about 30° and 45° and a wavelength $\lambda=350-1600$ nm the grating directs p-polarization components of incident light to the $-1^{st}$ order diffraction mode and s-polarization components of incident light to the $0^{th}$ order diffraction mode.

Further objects, features and advantages of this invention will become readily apparent to persons skilled in the art after a review of the following description, with reference to the drawings and claims that are appended to and form a part of this specification.

DETAILED DESCRIPTION

Figure 1:
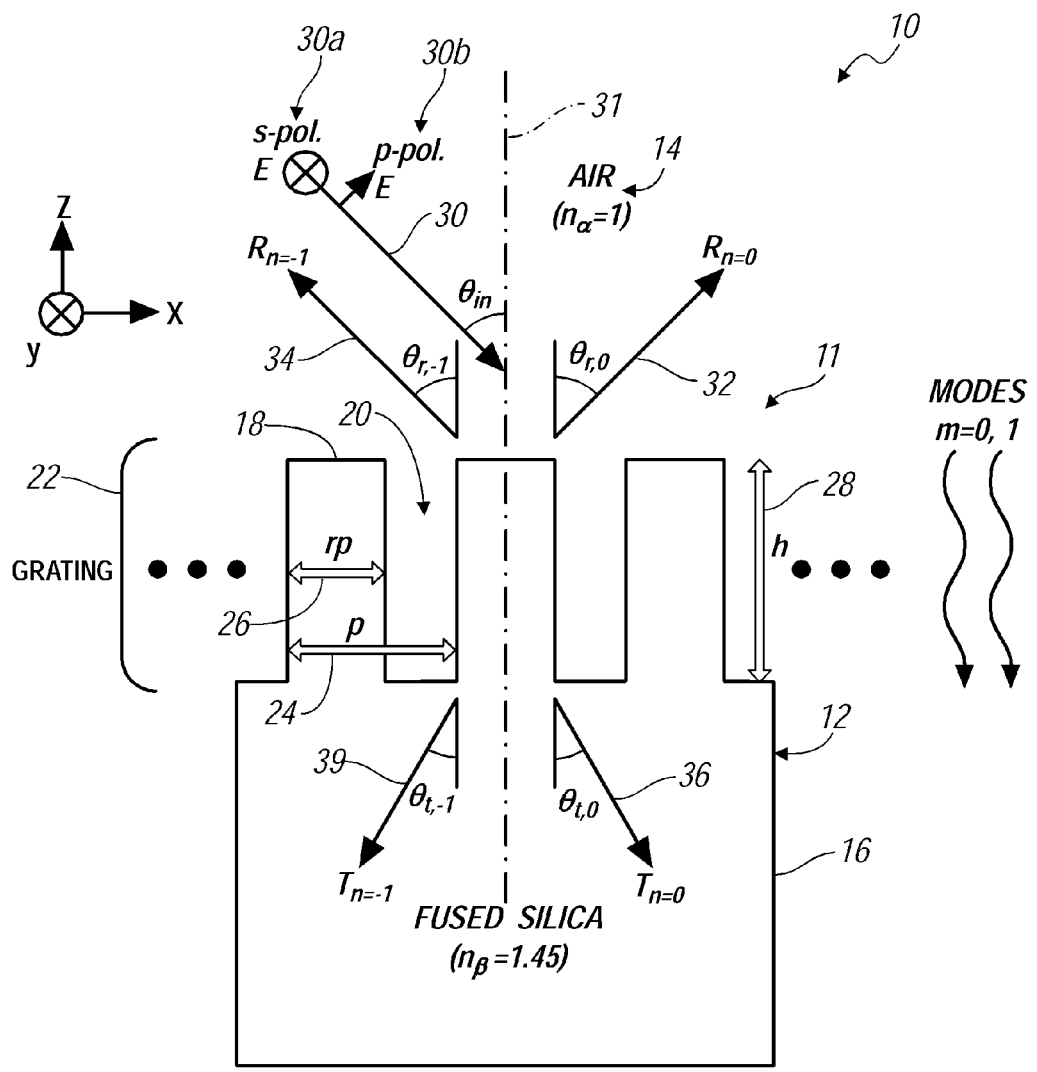
FIG. 1 is a side view of a transmission grating.

Referring to FIG. 1, a system 10 including a transmission grating 11 is provided. The transmission grating 11 may be a fused silica transmission grating with a silica to air interface. As such, air surrounds a silica structure 12 and is denoted by reference number 14. The silica structure 12 includes a base 16 of solid fused silica. Fused silica is very transparent and transmits a very broad bandwidth of light. Further, fused silica offers a very stable material that can be used over a wide range of temperature conditions. In addition, fused silica gratings may be easily etched to provide the grating properties required for many applications. Fused silica has an index of refraction of about 1.45 in contrast to air with an index of refraction of about 1. The symbol $n_\alpha$ is used to denote the refraction index of air and $n_\beta$ is used to denote the refraction index for fused silica.

Figure 2:
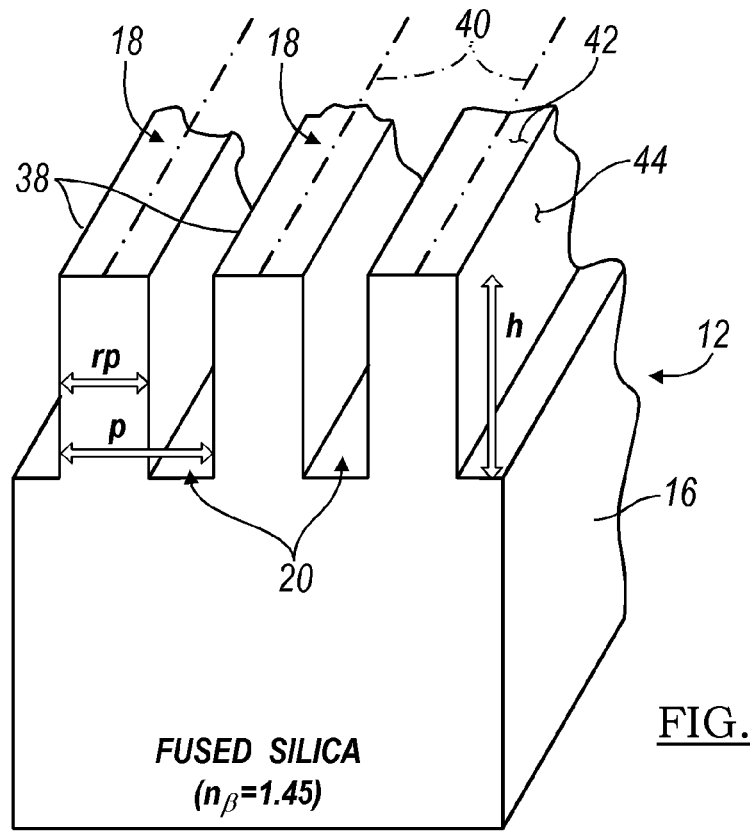
FIG. 2 is a perspective view of a transmission grating.
Figure 3:
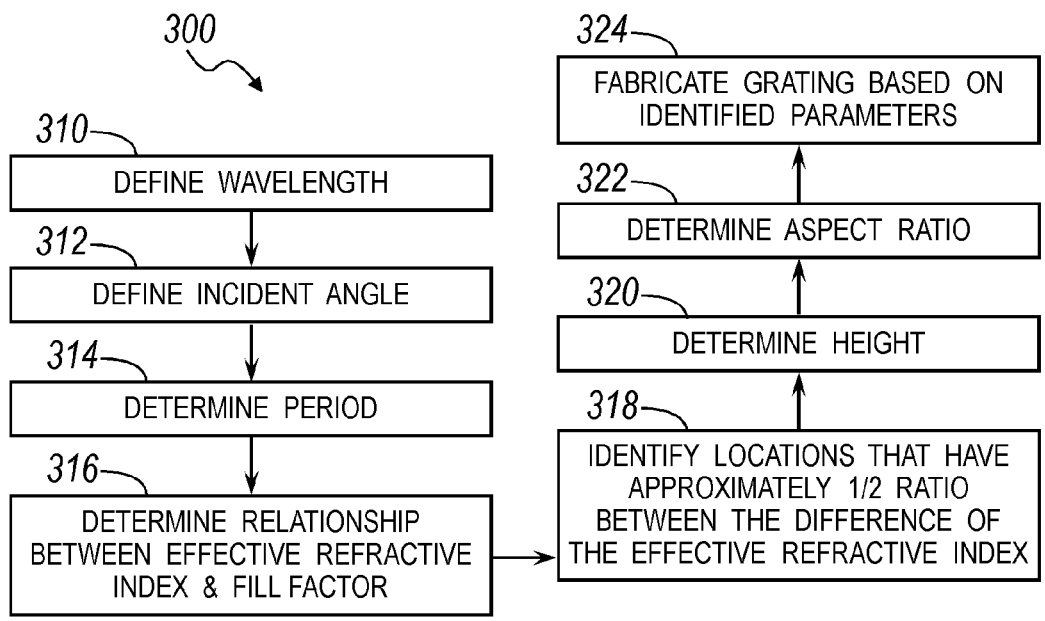
FIG. 3 is a flow chart illustrating a method for producing a grating.

Protrusions 18 extend from and are integral with the base 16. Being integral with the base 16 the protrusions 18 are also formed of fused silica. The protrusions 18 form grooves 20 located between each protrusion 18. The grooves 20 may be filled with air 14, thereby providing an air fused silica interface across the grating layer 22. The grating layer 22 diffracts light directed towards the transmission grating 11 from a light source into various diffraction modes. Each of the protrusions 18 may form a ridge 38 that extends to provide a uniform line structure, as denoted by lines 40 in FIG. 2. The protrusions 18 may have a top surface 42 and side surfaces 44. The side surfaces 44 may have various profiles or may be substantially straight.

Referring again to FIG. 1, incident light may be provided to the transmission grating 11, as denoted by arrow 30. The incident light 30 has an incident angle $\theta_{in}$ relative to the principle axis 31 of the grating projections 18. In addition, the incident light 30 may comprise various light polarizations. For example, the incident light may comprise components that are s-polarized 30A and components that are p-polarized 30B. S-polarization denotes when the electrical field is perpendicular to the plane of light propagation. P-polarization denotes where the electrical field is parallel to the plane of light propagation. When the incident light 30 interacts with the grating layer 22, the incident light 30 will form reflective components denoted by R and transmissive components denoted by T.

The reflective components may form a diffraction pattern comprised of a plurality of modes. For example, the 0 order mode of the reflective component $R_{n=0}$ is denoted by arrow 32. Similarly, the $-1^{st}$ order mode of the reflective component $R_{n=-1}$ is denoted by arrow 34. In addition, the transmission grating 11 is mounted in the Littrow mounting condition. Littrow mounting is the condition that produces the same angle of diffraction for both the $-1^{st}$ and $0^{th}$ order modes in opposite directions. The angle for the $-1^{st}$ order mode is $\theta_{r,-1}$, while the angle for the $0^{th}$ order mode is $\theta_{r,0}$.

The transmissive components may also form a diffraction pattern comprised of a plurality of modes. For example, the 0 order mode of the transmissive component $T_{n=0}$ is denoted by arrow 36. Similarly, the $-1^{st}$ order mode of the transmissive component $T_{n=-1}$ is denoted by line 39. Again, the Littrow mounting produces the same angle of diffraction for both the $-1^{st}$ and $0^{th}$ order modes in opposite directions. The angle for the $-1^{st}$ order mode is $\theta_{t,-1}$, while the angle for the $0^{th}$ order mode is $\theta_{t,0}$.

The resulting characteristics of the reflective and transmissive components are a factor of the refractive index (n) of the material, the period (p) of the grating, the fill factor (r) of the grating, and the height (h) of the grating. The period of the grating is the distance from the start of one groove to the start of the next groove. The period of the transmission grating 11 is denoted by reference numeral 24. The fill factor (r) can be defined as the ratio of the ridge width or groove width to the period of the grating, which is denoted by reference numeral 26. The height (h) of the grating is the distance from the top of the protrusion 18 to the bottom of the groove 20, which is denoted by reference numeral 28 in FIG. 1. As one would readily understand, the grooves 20 and protrusions 18 may not form exact right angles and various profiles may be used along the edge 42 of the protrusions 18. As such, the definition for the fill factor (r) or grating height (h) may be slightly modified depending on the shape of the projections 18 and grooves 20. As such, these values may be determined based on the center of gravity of the projections 18 and grooves 20.

A Littrow mounting condition of the transmission grating 11 having an interface of air/fused silica may be analyzed by modal analysis, and can be derived to provide simultaneously a high efficiency for p-polarization to the −1st order diffraction mode and for s-polarization to the $0^{th}$ order diffraction mode. The effective refractive index difference of the two polarizations has a ratio of 1/2 with an incident angle below 45° to select the minimum aspect ratio of the groove height to the ridge width or groove height to groove width. The grating structure fulfilling this condition exhibits a transmittance of more than 90% for an incident angle from 30° to 45°.

With regard to analysis methods, rigorous coupled-wave analysis has an advantage of accommodating various groove shapes. Several shapes of grooves such as semi-circle, rectangular, triangular, and curved surfaces can be used. Coupled-wave analysis is typically used for designing gratings, but due to various assumptions this method would not identify described parameters. Coupled-wave analysis is a numerical analysis and does anticipate propagation mode and evanescent mode integration. On the other hand, a modal analysis can provide a physical insight of diffraction phenomena, although it has less flexibility to adapt for various groove shapes.

When gratings are used for unpolarized light such as light emitting diodes (LEDs), both p-polarization and s-polarization should be simultaneously taken into account in the design. Particularly, the use of $-1^{st}$ and $0^{th}$ order diffraction extends the design degrees of freedom for optical devices, components, and assembled systems due to large bending of light.

However according to the method described herein, a Littrow mounting condition of rectangular grating at the interface of air/fused silica may be derived through a modal analysis to provide simultaneously a −1st order diffraction for p-polarization light and $0^{th}$ order diffraction for s-polarization light. The analysis can identify that the ratio of the effective refractive index difference of two propagation modes in the grating for p-polarization and s-polarization depends on incident angle. This results in a ratio of the effective refractive index difference to select the minimum aspect ratio of the grating height to the ridge width of fused silica or the groove width of air.

In the modal analysis, effective index, $n_{eff}$, of excited modes in the grating satisfies the eigenvalue equation.

$$\cos(\beta rp)\cos(\alpha(1-r)p) - \frac{1}{2}\left(\frac{\alpha t_\alpha}{\beta t_\beta} + \frac{\beta t_\beta}{\alpha t_\alpha}\right)\sin(\beta rp)\sin(\alpha(1-r)p) = \cos(kn_\alpha p\sin(\theta_{in})) \quad (1)$$

where $$\alpha = \sqrt{(kn_\alpha)^2 - n_{eff}^2} \quad (2a)$$

$$\beta = \sqrt{(kn_\beta)^2 - n_{eff}^2} \quad (2b)$$

$$t_\alpha = \begin{cases} \varepsilon_\alpha & (p-pol.) \\ 1 & (s-pol.) \end{cases} \quad (3a)$$

$$t_\beta = \begin{cases} \varepsilon_\beta & (p-pol.) \\ 1 & (s-pol.) \end{cases} \quad (3b)$$

k is the wave number, and $\epsilon_\alpha$ and $\epsilon_\beta$ are permittivity of air and fused silica. In Littrow mounting, the right part of equation (1) equals minus unity. Excited modes are numbered from the largest value of the square of the effective refractive index, $n_{eff}^2$. Within an incident angle $\theta_{in}$ from 30° to 90°, the lowest two modes, m=0 and 1, are propagation modes with positive $n_{eef}^2$, while other modes, m≧2, are evanescent modes with negative $n_{eef}^2$. Here, m=0 and 1 are considered with an incident angle $\theta_{in}$ from 30° to 85°. Also, the grating may provide the highest diffraction efficiency with the −1st order when the grating height, h, is set so as to have a phase difference of 180° between the lowest two modes, satisfying equations (4a), (4b).

$$n_d = \frac{\lambda}{2h} \quad (4a)$$

where effective refractive index difference, $n_d$, is written with $$n_d = n_{m=0} - n_{m=1} \quad (4b)$$

where $\lambda$ is free space wavelength, and $n_{m=0}$ and $n_{m=1}$ are effective refractive index of modes m=0 and 1.

A method for producing a grating according to one embodiment is provided in process 300. In block 310, the wavelength range of light is defined. In block 312, the incident angle of the light is defined. In block 314, the period of the grating is defined based on a Littrow mounting condition. In block 316, the relationship between the effective refractive index difference and the fill factor is determined. effective refractive index difference can be graphed with respect to the fill factor for both s-polarization and p-polarization, as shown in the graph in FIGS. 4a and 4b. In block 318, fill factor values are identified, for the above determined parameters, that have approximately a 1/2 ratio between the difference of the effective refractive index for s-polarization and p-polarization. In block 320, a height of the grating is determined for each instance having a 1/2 ratio between the difference of the effective refractive index for s-polarization and p-polarization. In block 322, the height and fill factor are used to determine the aspect ratio of the grating for each instance having a 1/2 ratio between the difference of the effective refractive index for s-polarization and p-polarization. In block 324, the grating may be fabricated, for example by etching, based on the parameters determined in the above noted steps. In one embodiment, the fill factor with the smallest height is selected. In another embodiment, the fill factor with the lowest aspect ratio is selected.

The methodology of designing a p-polarized and s-polarized −1st order diffraction grating, may be accomplished by extending equations (1)-(4). Since the relationship between p-polarizations and s-polarizations is considered, a more general expression is introduced. When grating height, $h_p$, for p-polarization or $h_s$ for s-polarization satisfies (5), each polarization enhances diffraction efficiency of the −1st order.

$$(n_{d,p}, n_{d,s}) = \left(\frac{(2i-1)\lambda}{2h_p}, \frac{(2j-1)\lambda}{2h_s}\right)(i = 1, 2, \ldots, j = 1, 2, \ldots) \quad (5)$$

The −1st order diffraction of p-polarization and the $0^{th}$ order diffraction of s-polarizations is simultaneously enhanced when each height has the same physical height, h, as is given by $$h = h_p = h_s \quad (6)$$

When grating parameters meet the polarization splitting condition, p- or s-polarized incident light couples to −1st or 0th, or vice vera. Polarization splitting condition is given by $$(n_{d,p}, n_{d,s}) = \begin{cases} \left(\frac{(2i-2)\lambda}{2h_p}, \frac{(2j-1)\lambda}{2h_s}\right) \\ \left(\frac{(2i-1)\lambda}{2h_p}, \frac{(2j)\lambda}{2h_s}\right) \end{cases} (i = 1, 2, \ldots, j = 1, 2, \ldots) \quad (7)$$

Figure 4A:
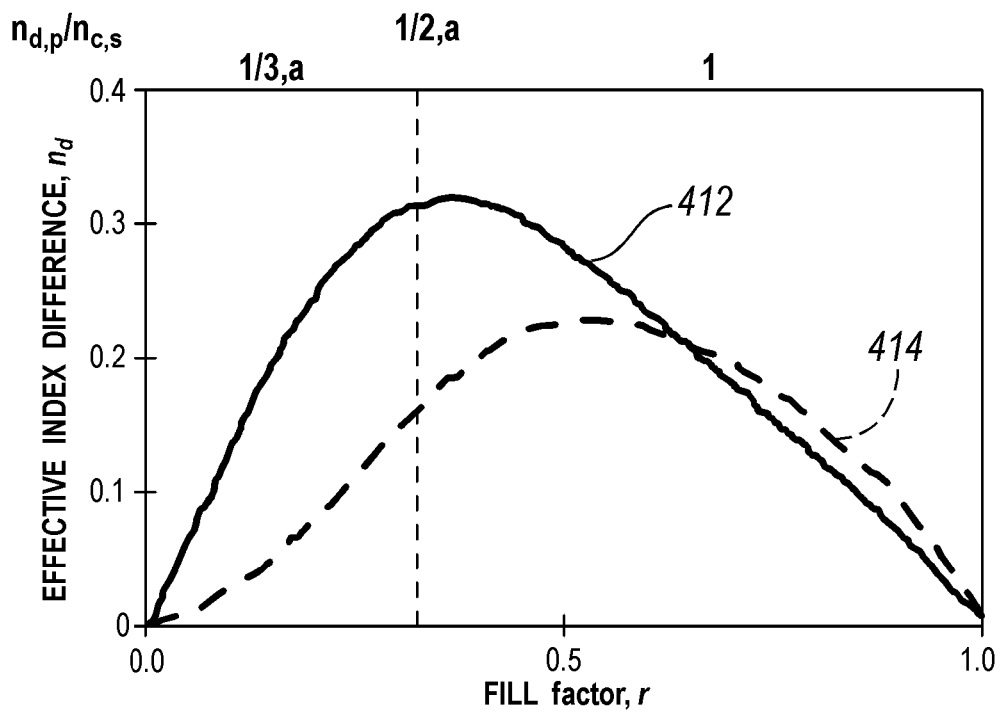
FIGS. 4a and 4b are a graphs illustrating the relationship of the effective refractive index difference between p-polarized light and s-polarized light relative to the fill factor of the grating.
Figure 4B:
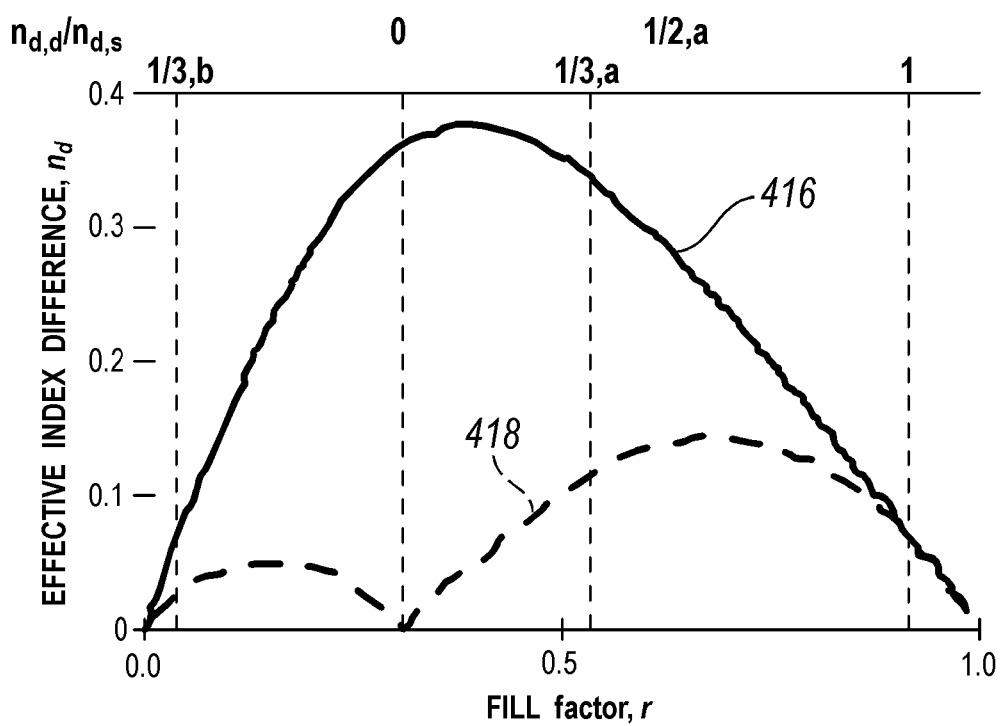

Note that $n_{d,p}$ becomes zero, depending on fill factor as shown in FIGS. 4a and 4b. The polarization splitting condition is written as $n_{d,p}/n_{d,s}$ according to equation (8) as well as (6) that is the same physical height for p- and s-polarizations.

$$\frac{n_{d,p}}{n_{d,s}} = \begin{cases} \frac{(2i-2)}{(2j-1)} & (-1st(s), 0th(p)), \\ \frac{(2i-1)}{(2j)} & (-1st(p), 0th(s)) \end{cases} \quad (8)$$

Note that coupling direction to −1st or 0th order is exchanged between the two conditions in equation (8). The two cases of $n_{d,p}/n_{d,s}=0$ and 1/2 are considered that provides the minimum aspect ratio of the grating.

One element of this design methodology is that the expression of the ratio $n_{d,p}/n_{d,s}$ allows appropriate grating parameters to be found easily according to the variation of fill factor for p-polarizations and s-polarizations. In this design methodology, infinite numbered combinations of (i,j) fulfill equation (7). In practice, an appropriate dimension of the grating may be effectively selected in view of fabrication constraints.

Now referring to FIGS. 4a and 4b, the effective index difference is graphed with respect to the variation of the fill factor. The fill factor is the ratio (r) of the grating ridge width of fused silica to the grating period (p). More specifically, line 412 of FIG. 4a denotes the relationship for s-polarization at $\theta_{in}=30°$ and line 414 of FIG. 4a denotes the relationship for p-polarization at $\theta_{in}=30°$. Meanwhile, line 422 of FIG. 4b denotes the relationship for s-polarization at $\theta_{in}=50°$ and line 424 of FIG. 4b denotes the relationship for p-polarization at $\theta_{in}=50°$.

All points on the curves of p-polarization or s-polarization provide the maximum diffraction efficiency of the −1st or $0^{th}$ order when the grating height is set to fulfill equations (7). From the view point of fabrication, the minimum aspect ratio of the grating height to the edge width of fused silica or air may be desired. Although infinite numbered combinations (i,j) may satisfy equation (7), the two combinations, (i,j)=(1, 2) is considered here, which corresponds to $n_{d,p}/n_{d,s}=1/2$.

In FIG. 4a, $n_{d,p}/n_{d,s}$ has a value of 1/2 at r=0.32. On the other hand, $n_{d,p}/n_{d,s}$ has 1/2 at r=0.65 as shown in FIG. 4b. In case of the design of either p-polarization or s-polarization, the fill factor is selected only considering the maximum effective refractive index to obtain the minimum grating height. However, it can be said from FIGS. 4a and 4b that $n_{d,p}/n_{d,s}=1/2$ should be considered to obtain the lower grating height in both p-polarizations and s-polarizations case, depending on an incident angle in Littrow mounting.

Figure 5A:
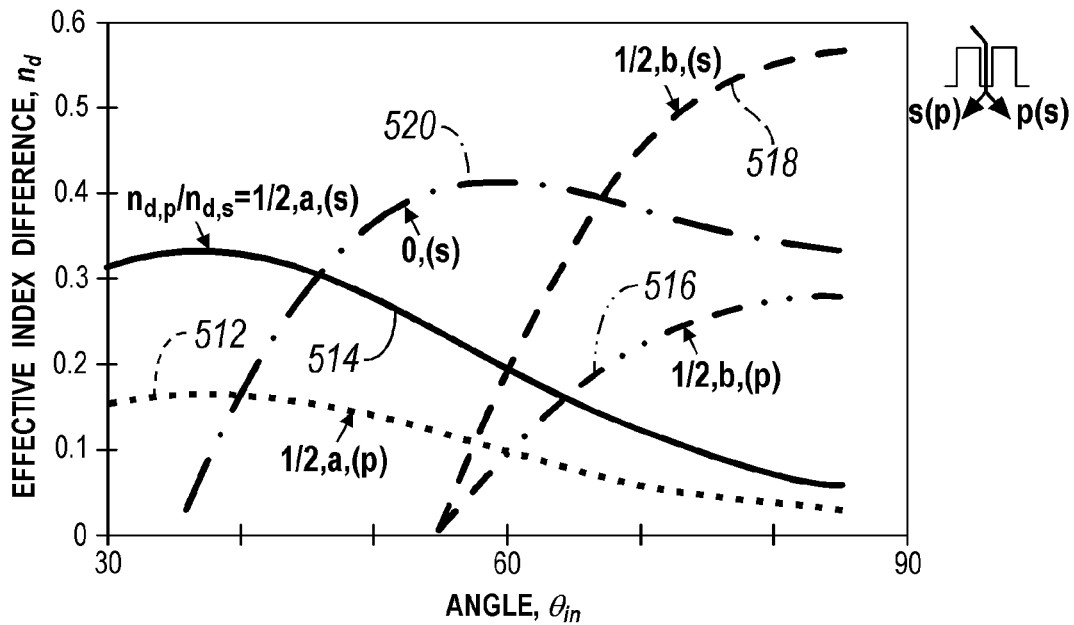
FIG. 5a is a graph illustrating the relationship of the effective refractive index difference relative to angle of incidence.

Effective refractive index differences fulfilling $n_{d,p}/n_{d,s}=1/2$ were calculated in $\theta_{in}$ from 30° to 85° and plotted in FIG. 5a. More specifically, line 512 is the effective index difference relative to the incident angle $\theta_{in}$ for p-polarization in a first instance (a) where the ratio of the effective refractive index difference is about 1/2. Line 514 is the effective index difference relative to the incident angle $\theta_{in}$ for s-polarization in the first instance (a) where the ratio of the effective refractive index difference is about 1/2. Similarly, line 516 is the effective index difference relative to the incident angle $\theta_{in}$ for p-polarization and line 518 is the effective index difference relative to the incident angle $\theta_{in}$ for s-polarization in a second instance (b) where the ratio of the effective refractive index difference is about 1/2. Finally, line 520 is the effective index difference relative to the incident angle $\theta_{in}$ for both s and p-polarizations for the instance where the ratio of the effective refractive index difference is 0.

The angular step width was basically 5° and further more angles were added at discontinuity points. As illustrated, $n_{d,p}$ and $n_{d,s}$ exist within $\theta_{in}$ from 30° to 35.5° with $n_{d,p}/n_{d,s}=1/2$, for an instance a. Then, $n_{d,p}/n_{d,s}=0$ additionally appears as $\theta_{in}$ increases from 35.5°, where $n_{d,p}=0$. When $\theta_{in}$ is larger than 55°, there are the three cases, $n_{d,p}/n_{d,s}=0$, 1/2, for instance a, and 1/2, for instance b.

Figure 5B:
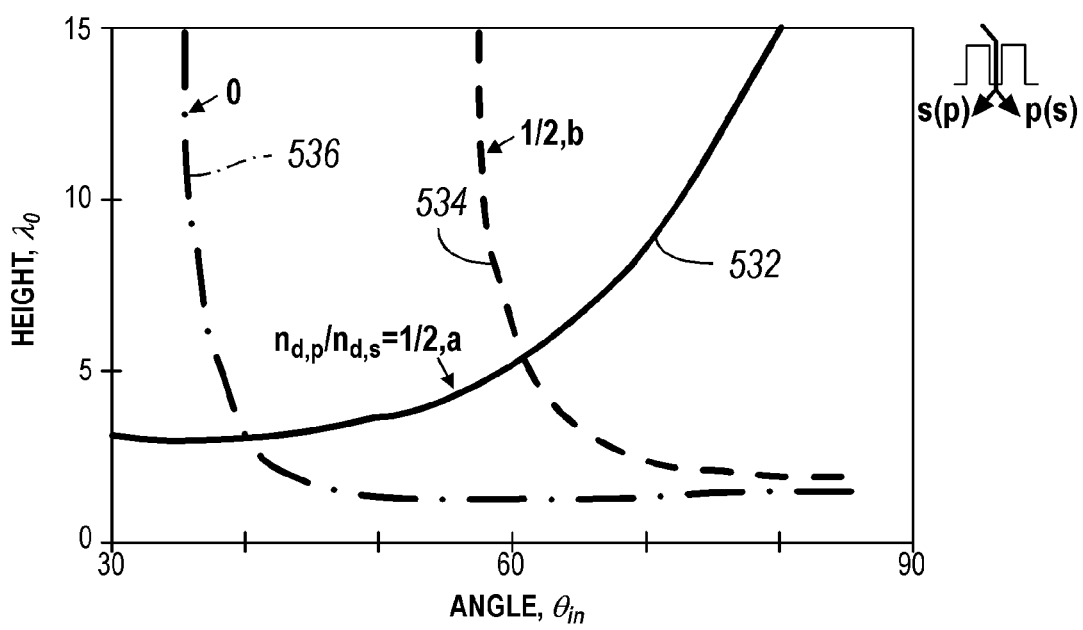
FIG. 5b is a graph illustrating the relationship of the height relative to angle of incidence.

The grating height was calculated from FIG. 5a, using equation (7), and is presented in FIG. 5b. As such, line 532 is the height relative to the incident angle $\theta_{in}$, in the first instance (a) where the ratio of the effective refractive index difference is about 1/2. Line 534 is the height relative to the incident angle $\theta_{in}$ in the second instance (b) where the ratio of the effective refractive index difference is about 1/2. Finally, line 536 is the height relative to the incident angle $\theta_{in}$ where the ratio of the effective refractive index difference is 0.

As illustrated, the grating height increases sharply for $n_{d,p}/n_{d,s}=0$ when decreasing $\theta_{in}$ below 45°. Accordingly, $n_{d,p}/n_{d,s}=1/2$ provides a lower height than $n_{d,p}/n_{d,s}=0$ when $\theta_{in}$ is less than 40°.

Figure 5C:
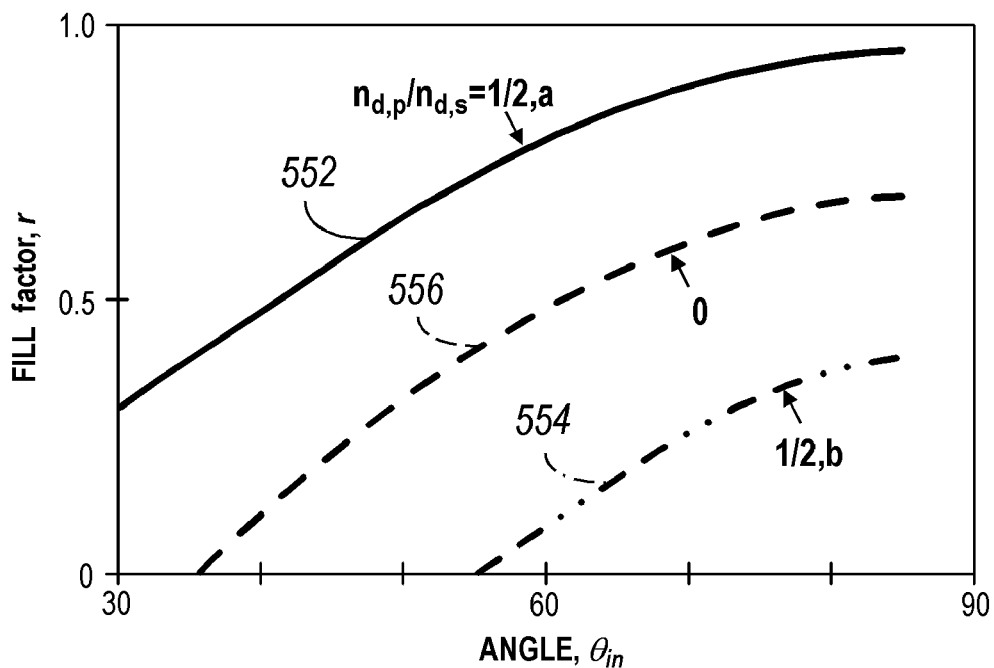
FIG. 5c is a graph illustrating the relationship of the fill factor relative to angle of incidence.

Accordingly, FIG. 5c illustrates the corresponding fill factor for each scenario. Line 552 denotes the value of the fill factor for each angle $\theta_{in}$ in the first instance (a) where the ratio of the effective refractive index difference is about 1/2. Line 554 denotes the value of the fill factor b for each angle $\theta_{in}$ in the second instance (b) where the ratio of the effective refractive index difference is about 1/2. Line 556 denotes the value of the fill factor for $n_{d,p}/n_{d,s}=0$ at each angle $\theta_{in}$. The fill factors for $n_{d,p}/n_{d,s}=0$, 1/2 a, and 1/2 b all increase with the increase of $\theta_{in}$.

Figure 5D:
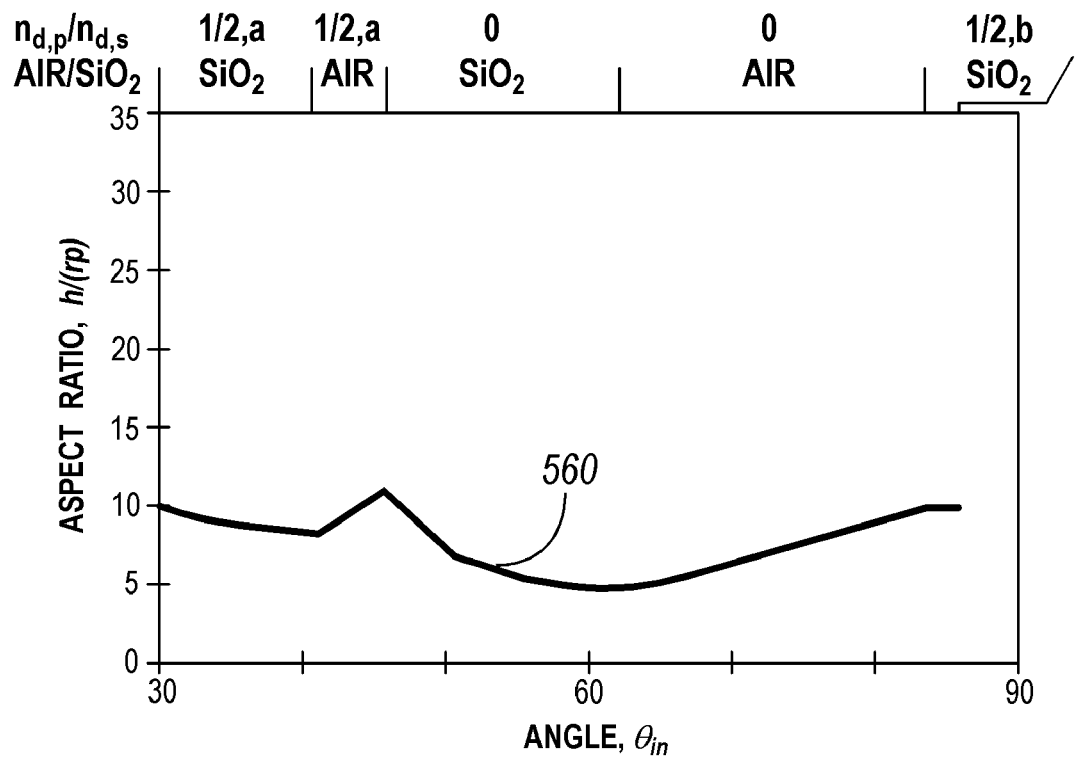
FIG. 5d is a graph illustrating the relationship of the aspect ratio relative to angle of incidence.
Figure 7:
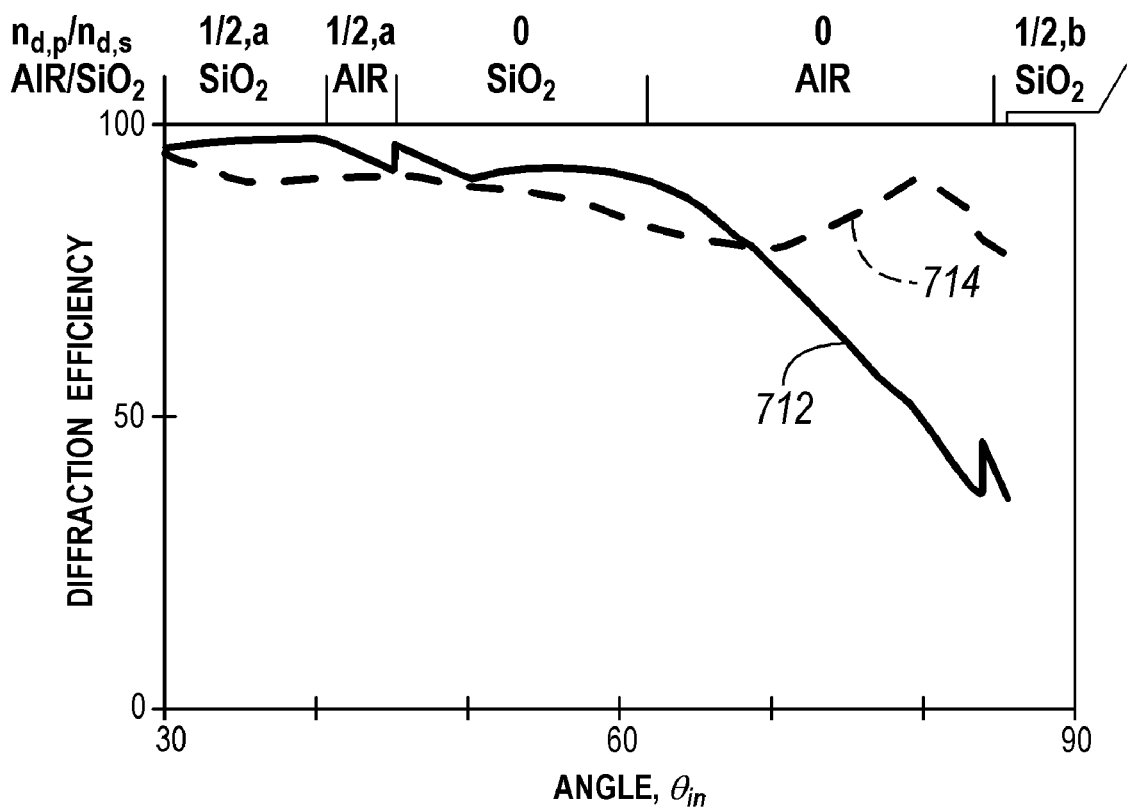
FIG. 7 is a graph illustrating the relationship of the diffraction efficiency relative to the angle of incidence.

In view of fabrication, the aspect ratio of the grating height to the edge width of fused silica or groove is taken to be smaller of the fused silica or groove width. The aspect ratio, $AP_{opt}$, is given by $$AS_{Opt} = \min_l \left( \max \left( \frac{h_l}{r_l \lambda}, \frac{h_l}{(1-r_l)\lambda} \right) \right) \quad (9)$$

where $h_l$ and $r_l$ are the grating height and fill factor that fulfill equations (5)-(8). When the fill factor is less than 0.5, the edge width of fused silica is used, and when the fill factor is greater than 0.5 the groove width is selected. In FIGS. 5a-5c, the grating parameters of the three cases, $n_{d,p}/n_{d,s}$=0, 1/2 a, and 1/2 b, are presented. Similarly, FIG. 5d illustrates the aspect ratio $AP_{opt}$ with respect to the variation of $\theta_{in}$, as denoted by line 560. The ratio $n_{d,p}/n_{d,s}$=1/2 provides the lowest aspect ratio from 30° to 45.3°, where the fill factor exceeds 0.5 at 41°. Then, $n_{d,p}/n_{d,s}$ is switched to zero with the further increase of $\theta_{in}$, resulting in aspect ratio less than 10.8λ over 30° to 85°. $n_{d,p}/n_{d,s}$ is switched to 1/2 again at 83.4°, although diffraction efficiency decreases as shown in FIG. 7. One very interesting and unexpected feature is that $n_{d,p}/n_{d,s}$=1/2 provides the lowest aspect ratio when $\theta_{in}$ is less than 45°, not $n_{d,p}/n_{d,s}$=0.

Figure 6A:
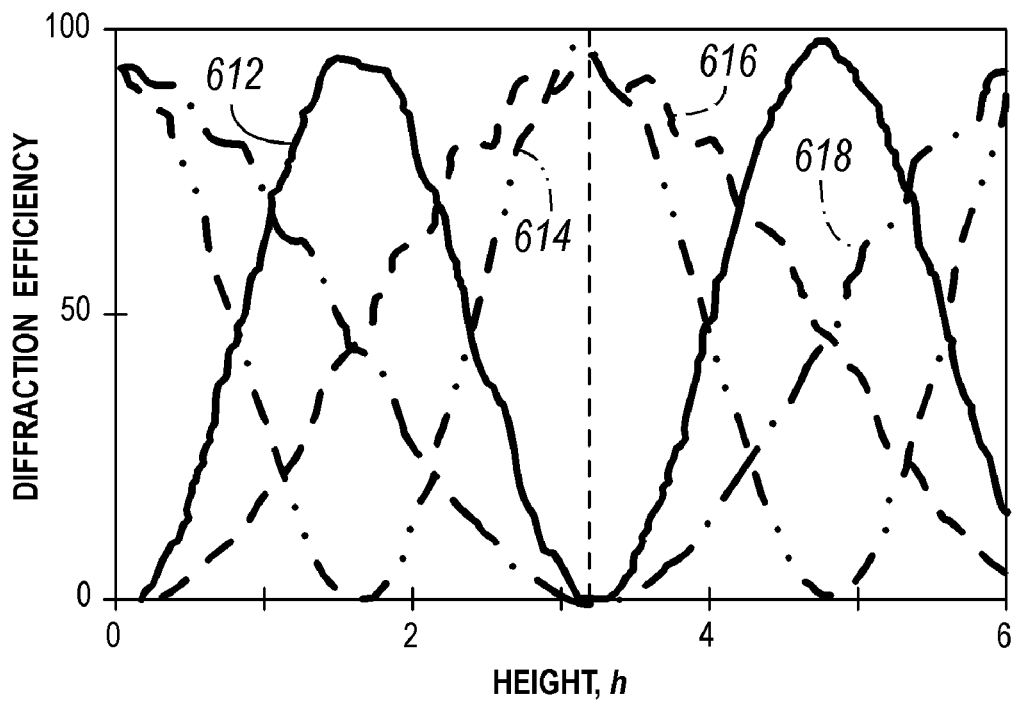
FIGS. 6a and 6b are a graphs illustrating the relationship of the diffraction efficiency relative to the height of the grating.
Figure 6B:
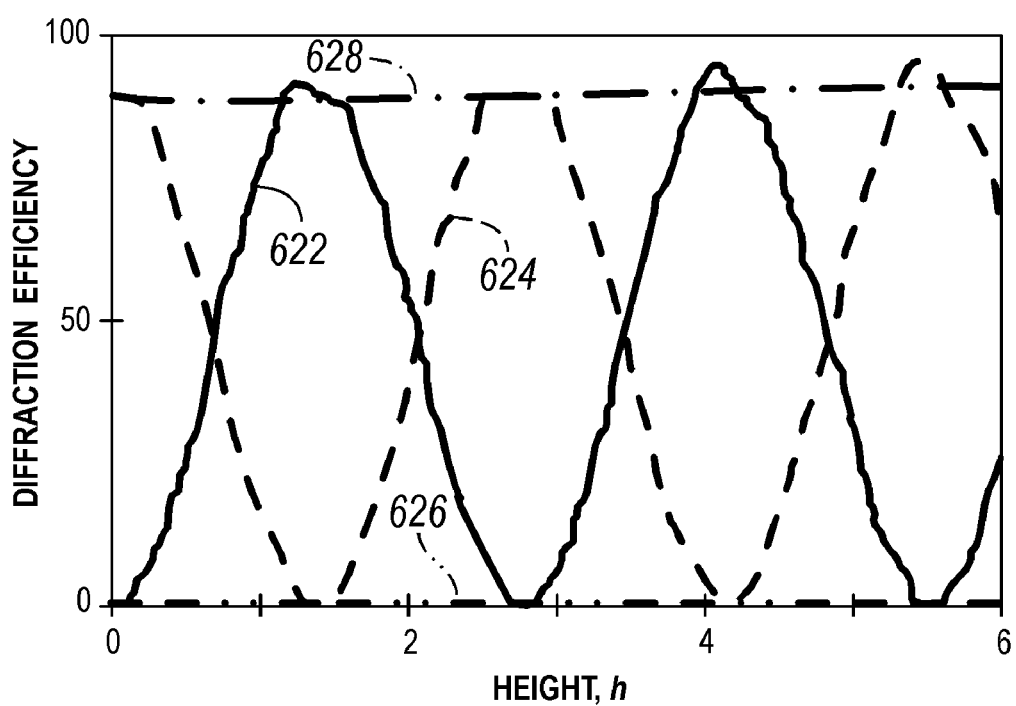

FIGS. 6a and 6b illustrate the diffraction efficiency with respect to a variation in height. In FIG. 6a, the incident angle $\theta_{in}$=30°, while the period p=λ, the fill factor r=0.64, and the height h=2.33λ. Line 612 is the s-polarization diffraction efficiency to the $-1^{st}$ order, while line 614 is the s-polarization diffraction efficiency to the $0^{th}$ order. Line 616 is the p-polarization diffraction efficiency to the $-1^{st}$ order, while line 618 is the p-polarization diffraction efficiency to the $0^{th}$ order.

In FIG. 6b, the incident angle is $\theta_{in}$=50°, while the period p=0.653λ, the fill factor r=0.54, and the height h=4.44λ. Line 622 is the s-polarization diffraction efficiency to the $-1^{st}$ order, while line 624 is the s-polarization diffraction efficiency to the $0^{th}$ order. Line 626 is the p-polarization diffraction efficiency to the $-1^{st}$ order, while line 628 is the p-polarization diffraction efficiency to the $0^{th}$ order. The grating parameters are consistent with FIG. 5d.

For the instance where $\theta_{in}$=30° in FIG. 6a, the period with variation of height for s-polarization is a half of that for p-polarization with $n_{d,p}/n_{d,s}$=1/2. Diffraction efficiency is 95% for p-polarization and 96.2% for s-polarization at h=3.18λ. On the other hand, p-polarization provides a flat characteristic when $n_{d,p}$=0, as shown in FIG. 6b. Diffraction efficiency is 89.3% for p-polarization and 90.5% for s-polarization at h=1.39λ.

Consistent with this method other specific implementation may be particularly useful. In one embodiment, the incident angle $\theta_{in}$ is about 30° and the alternating ridges and grooves have a grating period p=0.97λ-1.03λ, a fill factor r=0.27-0.37, and a grating height h=2.9λ-3.5λ. In another embodiment, the incident angle $\theta_{in}$ is about 40° and the alternating ridges and grooves have a grating period p=0.75λ-0.81λ, a fill factor r=0.43-0.53, and a grating height h=2.8λ-3.4λ.

FIG. 7 illustrates the best diffraction efficiency for splitting p-polarization and s-polarization for each of conditions discussed with respect to the variation of incident angle. Line 712 denotes the diffraction efficiency for s-polarization and line 714 denotes the diffraction efficiency for p-polarization. The grating parameters are consistent with FIG. 5d. Further, the angular step width was calculated at 5° steps and further more angles were added at discontinuity points. P-polarization couples to $-1^{st}$ order mode and s-polarization couples to $0^{th}$ order mode from 30° to 45.3° when $n_{d,p}/n_{d,s}$=1/2. Diffraction efficiency is higher than 90% for p-polarization and s-polarization in the incident angle range. Further, diffraction efficiency is higher than 80% for p-pol. and 86.2% for s-pol. from 30° to 65° where the polarization coupling order is exchanged from 45.3° to 60° with $n_{d,p}/n_{d,s}$=0.

As a person skilled in the art will readily appreciate, the above description is meant as an illustration of the principles this application. This description is not intended to limit the scope or application of the invention in that the invention is susceptible to modification, variation and change, without departing from spirit of the invention, as defined in the following claims.

We claim:

1. A grating structure comprised of a fused silica base, the fused silica base having alternating ridges and grooves, the ridges and grooves forming a fused silica to air interface, the grating having a ratio of the effective refractive index difference of p-polarization to the effective refractive index difference of s-polarization, where the numerator of the ratio is an odd number and the denominator of the ratio is an even number, thereby directing p-polarization components of incident light to the $-1^{st}$ order diffraction mode and s-polarization components of incident light to the $0^{th}$ order diffraction mode, where the incident light has an incident angle $\theta_{in}$ of between about 30° and 45° and a wavelength λ=350-1600 nm.

2. The grating structure according to claim 1, wherein the ratio of the effective refractive index difference of p-polarization to the effective refractive index difference of s-polarization is about 1/2.

3. The grating structure according to claim 1, wherein the grating is in a Littrow mounting condition, such that a $-1^{st}$ order diffraction mode has a first diffraction angle and a $0^{th}$ order diffraction mode has a second diffraction angle, wherein the first diffraction angle is equal to the second diffraction angle.

4. The grating structure according to claim 1, wherein the incident angle $\theta_{in}$ is about 30° and the alternating ridges and grooves have a grating period p=0.97λ-1.03λ, a fill factor r=0.27-0.37, a grating height h=2.9λ-3.5λ.

5. The grating structure according to claim 1, wherein the incident angle $\theta_{in}$ is about 40° and the alternating ridges and grooves have a grating period p=0.75λ-0.81λ, a fill factor r=0.43-0.53, a grating height h=2.8λ-3.4λ.

6. A grating structure comprised of a base, base having alternating ridges and grooves, the ridges and grooves forming a ratio of the effective refractive index difference of p-polarization to the effective refractive index difference of s-polarization directing p-polarization components of incident light to the $-1^{st}$ order diffraction mode and s-polarization components of incident light to the $0^{th}$ order diffraction mode, where the incident light has an incident angle $\theta_{in}$ of between about 30° and 45° and a wavelength λ=350-1600 nm.

7. The grating structure according to claim 6, wherein the ratio of the effective refractive index difference of p-polarization to the effective refractive index difference of s-polarization is about 1/2.

8. The grating structure according to claim 7, wherein the grating is in a Littrow mounting condition, such that a $-1^{st}$ order diffraction mode has a first diffraction angle and a $0^{th}$ order diffraction mode has a second diffraction angle, wherein the first diffraction angle is equal to the second diffraction angle.

9. The grating structure according to claim 7, wherein the base is a fused silica base, the fused silica base having alternating ridges and grooves, the ridges and grooves forming a fused silica to air interface.

10. The grating structure according to claim 9, wherein the incident angle $\theta_{in}$ is about 30° and the alternating ridges and grooves have a grating period $p=0.97\lambda$-$1.03\lambda$, a fill factor $r=0.27$-$0.37$, a grating height $h=2.9\lambda$-$3.5\lambda$.

11. The grating structure according to claim 9, wherein the incident angle $\theta_{in}$ is about 40° and the alternating ridges and grooves have a grating period $p=0.75\lambda$-$0.81\lambda$, a fill factor $r=0.43$-$0.53$, a grating height $h=2.8\lambda$-$3.4\lambda$.

12. A method of splitting an unpolarized light beam comprising: providing a grating;

providing an unpolarized light beam at an incident angle between about 30° and 45°;

splitting the unpolarized light beam such that p-polarization components of incident light to the $-1^{st}$ order diffraction mode and s-polarization components of incident light to the $0^{th}$ order diffraction mode, wherein the grating has a ratio of the effective refractive index difference of p-polarization to the effective refractive index difference of s-polarization, where the numerator of the ratio is an odd number and the denominator of the ratio is an even number.

13. The method according to claim 12, wherein the grating is in a Littrow mounting condition.

14. The method according to claim 12, wherein the ratio of the effective refractive index difference of p-polarization to the effective refractive index difference of s-polarization is about 1/2.

15. A method of producing a grating structure comprising:
defining a wavelength;
defining an incidence angle;
determining a grating period based on a Littrow mounting condition; determining the relationship between the effective refractive index and the fill factor;
identifying a fill factor where the ratio between the effective refractive index difference of p-polarization to the effective refractive index difference of s-polarization is about 1/2;
determining the height of the grating;
etching the grating based on the grating period, fill factor, and height.

16. The method according to claim 15, further comprising calculating the relationship between the height of the grating and the diffraction efficiency and selecting the smallest height where the ratio between the effective refractive index difference of p-polarization to the effective refractive index difference of s-polarization is about 1/2.

17. The method according to claim 15, further comprising calculating the relationship between the aspect ratio of the grating and the diffraction efficiency and selecting the smallest aspect ratio where the ratio between the effective refractive index difference of p-polarization to the effective refractive index difference of s-polarization is about 1/2.

* * * * *